Figure 5:
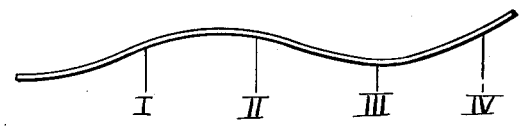

Jan. 25, 1927.
C. O. FAIRCHILD ET AL
1,615,447
MEASURING INSTRUMENT SCALE
Filed August 7, 1923    2 Sheets-Sheet 1
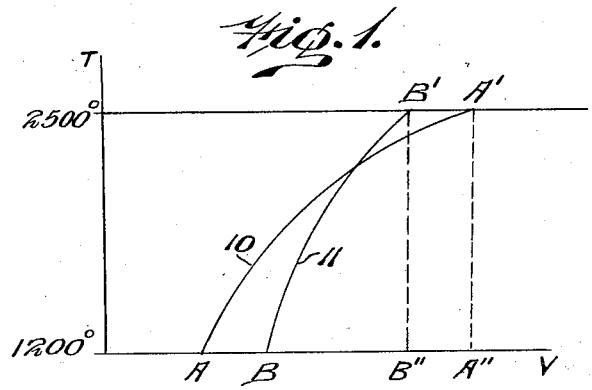
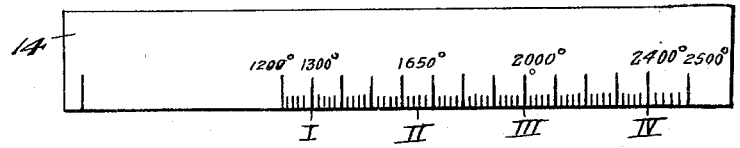
INVENTORS
Charles O. Fairchild
and Francis E. Bash.
by Robert M. Bau
ATTORNEY Jan. 25, 1927. 1,615,447
C. O. FAIRCHILD ET AL
MEASURING INSTRUMENT SCALE
Filed August 7, 1923  2 Sheets-Sheet 2

INVENTORS
Charles O. Fairchild
and Francis E. Bash.
by Robert M. Dow
ATTORNEY.

Patented Jan. 25, 1927.

1,615,447

UNITED STATES PATENT OFFICE.

CHARLES O. FAIRCHILD, OF WASHINGTON, DISTRICT OF COLUMBIA, AND FRANCIS E. BASH, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

MEASURING INSTRUMENT SCALE.

Application filed August 7, 1923. Serial No. 656,237.

The present invention relates to a method of and means for making scales for measuring temperatures, electric currents, voltages, or resistances, and more particularly to a scale for use with optical pyrometers such as the Morse or disappearing filament pyrometer, wherein an incandescent electric lamp filament is heated by an electric current, to serve as a light standard for comparison with a body, such as molten metal or other glowing material heated to a brightness which is a measure of its temperature, this latter being then determined by a reading of a galvanometer in circuit with the aforesaid lamp filament and the deflection of the galvanometer being dependent upon the amount of current flowing through the incandescible body or lamp filament. Generally as now used pyrometers of this type have their galvanometer scales calibrated in terms of current, or voltage or ohms with respect to the lamps used and tables are furnished whereby the indicated galvanometer readings can be translated into temperature values. It follows, therefore, that it is very desirable that the lamps used be standard or as nearly so as possible as regards their temperature-resistance, temperature-voltage or temperature-current characteristics, so that in case a lamp of a particular instrument becomes broken, and has to be replaced, the change can be made by the substitution of another lamp, the calibration of which is such as to insure correct temperature measurements without recalibration of the pyrometer. Obviously, it is a very difficult matter to make two lamps exactly alike because of the variations in the dimensions and the material of the filaments and the degree of vacuum, but in the manufacture of these lamps a certain degree of uniformity is obtained and a single lot of lamps will have calibration characteristics which vary in a substantially uniform manner; that is, if a current temperature curve is plotted for each lamp, these curves will all have the same general shape and may be expressed in an equation as follows: $I = a + bt + ct^2 + dt^3$.

Some of the objects of the present invention are to provide a scale graduated in temperatures or any other desired units for use with a particular lamp in a pyrometric system to give accurate readings of temperature or electrical units being measured; to provide means for utilizing a standard scale calibrated for the temperature electrical characteristics of a lamp filament taken as a standard, for the purpose of forming a scale calibrated with respect to a lamp having characteristics differing from the lamp filament taken as a standard; to provide means for photographically obtaining from a standard scale a scale for use with a particular lamp filament having different electrical characteristics from the lamp filament taken as a standard; to provide interchangeable lamp units whereby any one of a series of lamps may be used with any of a number of galvanometers, ammeters, voltmeters or any other suitable electrical instruments (which have the same characteristics) without appreciable indicated error in temperature or other measurements; to provide a pyrometric apparatus wherein broken or defective lamp units can be replaced by a new lamp unit to give accurate indicated measurements without the necessity of returning the galvanometer or other measuring instrument to the factory for recalibration with respect to the new lamp substituted; to provide an improved scale for pyrometric apparatus wherein variations of the electrical characteristics of a lamp from the electrical characteristics of a standard lamp can be altered to give a true and accurate reading of the temperature being measured; to provide a method of making a scale from a standard lamp scale whereby the new scale becomes an accurate measure of temperature or current values of a lamp having different characteristics from the standard lamp; to provide means for making a scale for a lamp having characteristics different from a standard lamp by sighting upon the standard scale in a distorted position or turned at an angle to the sighting means; to provide means for calibrating a scale in degrees of temperature for direct reading of temperature values in a pyrometer; and to provide other improvements as will hereinafter appear.

In the accompanying drawings are illustrated some of the many forms in which the present invention may be embodied.

Figure 6:
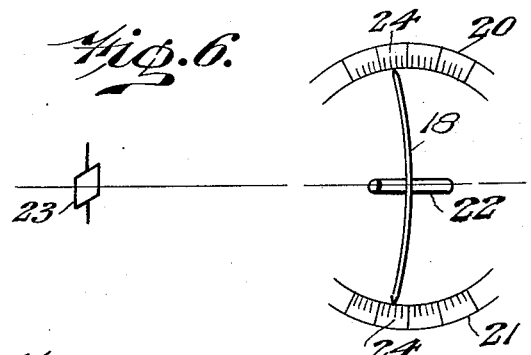
Figure 7:
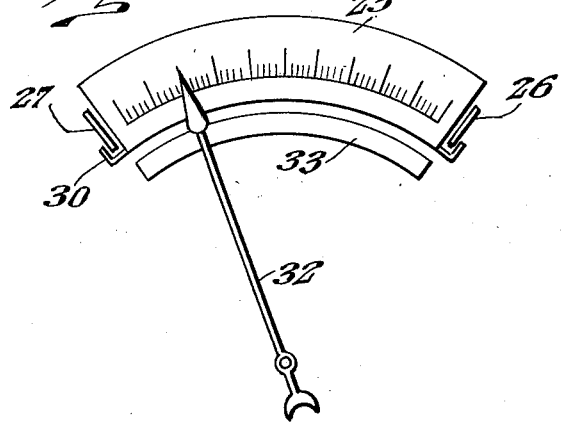
Figure 8:
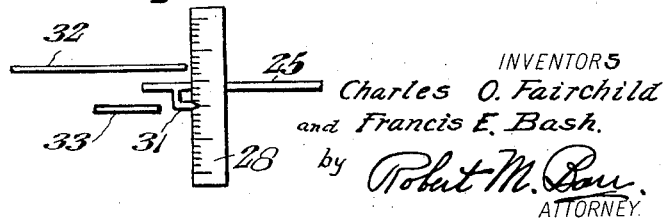

Fig. 1 represents graphically the respective curves of the temperature-current characteristics of certain lamps; Fig. 2 represents a standard scale graduated in degrees of temperature; Fig. 3 represents a calibration scale graduated arbitrarily either as to current, volts or ohms; Fig. 4 is a diagrammatic representation of one form of apparatus embodying the present invention; Fig. 5 represents a plan of the standard scale as distorted or bent to conform to the characteristics of a lamp differing from the standard lamp; Fig. 6 is a diagrammatic representation of another form of the apparatus for carrying out the present invention; Fig. 7 represents another form in which the invention may be embodied; and Fig. 8 is a detail of one end of the form shown in Fig. 7.

Referring to the drawings, there is shown in Fig. 1 a curve chart, in which ordinates are temperatures and abscissæ current, the lowest point of the temperature scale being taken as 1200 degrees F., and the scale covering a range to approximately 2500 degrees F. The chart shown illustrates a characteristic curve 10, which may be either a theoretical characteristic curve or a curve plotted by taking current readings at different temperatures throughout a given range for a selected lamp as a standard, from which the characteristics of this curve are employed to produce a standard scale of temperature values. Preferably, this curve 10 has a characteristic which includes the maximum variation of temperature for all other lamps, and in this way forms a standard unit covering all probable lamp variations. As indicated on the chart, the curve 10 has its starting point at a point A, representing the current corresponding to the 1200 degree temperature, and having its opposite or terminal end intersecting the 2500 degree line at a point A'. A second curve 11 is shown on Fig. 1, which represents the characteristic of another lamp of the series to be used with an apparatus which is calibrated with respect to the standard lamp unit, and it will be evident, from this curve, that the minor differences, due to lamp filament and other causes in manufacture, have produced a filament which for a current change of B to B'' milliamperes will give a temperature change of 1300 degrees, this current change being considerably less than the standard current change of A to A'', required to produce the same temperature change in the standard lamp. Obviously, therefore, the substitution of the lamp B for the standard lamp A in the pyrometer system would result in considerable error in the readings unless corrections can be made for this difference, and it is an object of the present invention to provide a scale graduated and calibrated with respect to the characteristic of the lamp of curve 11 by the use of a standard scale 14.

For the purpose of so producing a scale or scales for a lamp or lamps having different electrical characteristics, a scale 12 is provided, on which we mark off certain significant readings of a calibrating meter obtained in calibrating the lamp for which a testing meter scale is to be produced. The scale 12 is conveniently graduated either in amperes, or volts or ohms, or any other suitable unit of measurement, such scale being preferably etched on a ground glass plate 13. For example, each lamp to be used is calibrated at three or four temperatures, somewhat evenly distributed and taken, for example as 1300 degrees F., 1650 degrees F., 2000 degrees F., and 2400 degrees F., the corresponding calibrating meter readings being laid off on the ground glass scale 12 as indicated at I, II, III and IV, Fig. 3. For use with the scale 12 there is a corresponding standard temperature scale 14, preferably of an enlarged size, graduated in degrees, and calibrated with respect to a standard lamp or calculated over a range from 1200 degrees F. to 2500 degrees F. The temperature graduations on the scale 14 and the meter reading scale 12, thus are in correct correspondence for a standard lamp, namely one having the characteristics of curve 10 of Fig. 1. Assuming the calibrated lamp, the current values of which have been marked off on the scale 12 as described above, to be one having the electrical characteristics corresponding to the curve B—B', it is evident that some regraduation or revision of the standard scale 14 is necessary to properly indicate by such scale the temperature-current changes of the lamp B. In order to so revise the scale 14, the present method has been devised wherein the characteristic standard curve 10 is in effect swung about a selected axis or is distorted until it assumes a position wherein all points of the curve 10 fall upon or are parallel to the corresponding points of the curve 11. Generally the two curves will lie parallel and are brought into coincidence by shifting the distorted scale relative to the other scale.

To utilize the scales 12 and 14 in providing a testing meter scale from which the temperatures of the lamp B can be directly read accurately, several means can be employed, one of which consists in mounting the standard scale 14, which is the scale for the lamp A taken as a standard, in front of the lens 15 of a camera, so that the scale image can be brought to a focus upon the ground glass 13 and have a size substantially the same as the scale 12 to give the effect of one scale superposed upon the other. As the scale 12 has been initially calibrated for the lamp B, the points I, II, III and IV indicate on the scale 12 the respective currents corresponding to the selected temperatures 1300 degrees F., 1650 degrees F., 2000 degrees F. and 2400 degrees F., and the four corresponding degree points on the scale 14 must be brought into coincidence with the current value points I, II, III and IV. This is accomplished in the present instance by bending, curving or distorting the scale 14 until the projection of the respective temperature points 1300 degrees F., 1650 degrees F., 2000 degrees F. and 2400 degrees F, coincide with the aforesaid points on the scale 12. Having adjusted the position of the standard scale 14 to correspond with the calibration of this particular lamp of the curve B—B', its image as now appearing on the ground glass is that of a scale which will give approximately true temperature readings for the lamp B through a range of temperature. The ground glass 13 with its scale 12 is now removed from the camera and a photographic plate substituted, whereupon a photograph is taken of the scale 14 in its distorted or set position, and this photographic scale, when printed from the negative, becomes the proper scale to be used in the ammeter or other measuring instrument with which the particular lamp is paired. Thus, in using the foregoing method, it will be understood that as each lamp is calibrated at the factory, a direct reading scale graduated in degrees is made for that lamp, and packed or sent out with that lamp with instructions that this particular scale is for use only with this lamp. Hence, where a lamp of a pyrometer is broken during use, a new lamp unit may be ordered and placed in the pyrometer system, but substituting for the scale then in the galvanometer the new scale which is furnished with the lamp, and readings therefrom with the new scale and new lamp accurately indicate the required temperatures without the additional recalibration of the galvanometer or other measuring instrument employed. In the practical photographic step described above, it should be noted that it is preferable to employ a long focus lens, so that a sharp and accurate focus can be obtained, and whereby a slight motion of the camera will not necessitate refocusing.

While the foregoing method deals entirely with a distortion or adjustment of the standard scale, it will be understood that this may be done in various other ways, as for example, providing a camera in which the plate-holder may be distorted or bent in such a manner as to bring about the correct interposition and alinement of the two scales, so that when the photograph is taken, the result will be the same as in the former instance. The flexible film type of camera lends itself particularly well to this latter suggested method.

The complete scale formed by the aforesaid photographing of a standard scale, which has been varied or manipulated to have the effect of a scale for a lamp having characteristics different from the standard lamp, is now attached to or packed with the particular lamp for which it is made, and when the unit is sent out with a galvanometer or for substituted use for a defective lamp in a pyrometer, the scale is used with that galvanometer or replaces the original scale of the galvanometer in which the unit is substituted.

In Fig. 6 of the drawings, another method and means are shown for so varying a standard scale as to give the effect of a scale for a lamp having electrical characteristics different from the standard lamp, and in this form of the invention a standard scale 18, graduated in degrees of temperature, and calibrated or calculated with respect to the standard lamp unit, is arranged for use in a telescopic mirror type of galvanometer. In this apparatus, the scale 18 is of rigid material and has its ends located respectively in operative or reading relation with respect to two adjusting scales 20 and 21. The telescope 22, which may be of any desired type, is located, as is usual in these instruments, at substantially the central portion of the scale, and sights upon the mirror 23 of the galvanometer and employs the usual hair-line for reading purposes. In this arrangement, the adjusting scales 20 and 21 each have a setting point 24 for the adjacent end of the scale 18, such points having been calculated for a particular lamp to give a distortion of the scale 18, so that as viewed from the mirror 23 it will appear as the scale for the aforesaid particular lamp. In other words, when the ends of the scale 18 have been respectively brought opposite the two calculated points 24 of scales 20 and 21, the image of the standard scale corresponds to the calibrated values of a lamp curve different from the standard curve, and the scale gives correct indications of temperature of the lamp for the current measured.

In Fig. 7, another form of the invention is shown, wherein a galvanometer system having a pointer movable over the scale is shown, and wherein a standard scale 25, graduated in degrees of temperature and of a suitable rigid material, is mounted with the instrument. At each end of this scale, and extending substantially at right angles with respect to the plane of the scale are two adjusting scales 26 and 27, each of which is provided with a calculated point 28 for the particular lamp with which the two scales are to be used, and to which the ends of the scale 25 are set by means of the pointers 30 and 31. The effect of so turning the standard scale 25 about an axis to a predetermined set position is, when viewed from the proper reading position, that of a scale for the particular lamp to which the scales 26 and 27 have their points calibrated, and gives a true temperature reading throughout a range of temperatures for a lamp having different electrical characteristics from the standard lamp. In order that the user of the instrument may obtain an accurate reading of the galvanometer pointer 32, it is desirable to provide a fixed mirror 33 extending lengthwise of the scale 25 and beneath the pointer 32, so that the pointer and its reflected image in the mirror can be brought into alinement by the eye, and thus accurately read the position of the pointer on the scale 25.

A common characteristic of the various embodiments of the invention described above is that a projection of a standard scale is made, and so distorted as to make the distance between the projections of certain points of the standard scale different from the actual distance between those points and in accordance with the calibrated characteristics of the individual lamp for which the scale projection is made. In the method described in connection with Figs. 1 to 4, the scale 14 is projected onto the plane of the scale 12, and the described distortion, or bending of the scale 14, changes the angular relation of portions of that scale with respect to the plane of the scale 12. In the apparatus shown in Fig. 6, the angular relations between any small portion of the scale 18 projected onto the mirror 23 and reflected from the latter through the telescope 22 in any particular position of the mirror 23, is varied by moving the ends of the scale 18 with respect to the scales 20 and 21. In the apparatus shown in Figs. 7 and 8, the inclination of the scale 26 with respect to the plane of observation, to-wit; the plane of movement of the pointer 32, is varied by moving the ends of the scale 25 in a direction perpendicular to the plane of the pointer 32 along the scales 26 and 27.

Although only four forms are shown in which this invention may be embodied, it is to be understood that the invention is not limited to any specific construction, but might be applied in various forms without departing from the spirit of the invention or the scope of the appended claims.

Having thus described our invention, we claim:

1. The method of utilizing a measuring scale calibrated with respect to the characteristics of a standard device in producing a measuring scale for use with a device having characteristics somewhat different from those of said standard device which comprises the production of a projection of the first mentioned scale distorted to vary the distance between the projections of selected points of said scale by a predetermined distance different from the actual distance between said points.

2. The method of producing a measuring scale for use with a device having determined characteristics somewhat different from those of a standard device by means of a scale calibrated for the standard device which consists in so projecting an image of the last mentioned scale as to vary the distance between the images of selected points of said scale by a predetermined distance different from the actual distance between said points and photographically reproducing said image.

3. The method of producing a pyrometer scale for use with a pyrometer lamp filament having determined characteristics different from those of a standard lamp filament, which consists in producing such a distorted projection of a standard pyrometer scale calibrated with respect to the standard pyrometer lamp filament, as to make the distance between the projections of certain predetermined scale markings of the standard scale different from the actual distance between those scale markings, and in correspondence with the respective corresponding determined characteristics of the first mentioned filament, and using the distorted projection of said scale in reproducing the desired scale.

4. The method of making a pyrometric measuring scale for a pyrometer lamp filament which consists in locating upon a scale graduated in electrical units a number of points corresponding to selected temperature-electrical characteristics of a lamp filament having characteristics different from a standard lamp filament, superposing upon said scale the image of a scale graduated in degrees and calibrated with respect to the temperature-characteristics of a standard lamp filament, causing predetermined temperature graduations of said standard scale to be brought respectively into coincidence with said calibrated points, and photographing said standard scale in its manipulated position.

5. The method of obtaining accurate temperature readings throughout a temperature range for a lamp filament which consists in determining certain temperature-electrical characteristics for a lamp filament having optical pyrometric temperature-electrical characteristics differing from the characteristics of a standard lamp filament, indicating said determined characteristics upon a scale graduated in electrical units, setting corresponding temperature values of a temperature scale calibrated for said standard characteristics in coincidence with said certain calibrated characteristics respectively to cause said standard scale to have the effect of a scale graduated in temperatures for said first mentioned lamp filament, and taking readings of said standard scale in its set position.

6. An apparatus for making measuring scales comprising a scale graduated with respect to the temperature-characteristics of a standard pyrometric lamp filament, a scale graduated in electrical units having a plurality of points calibrated with respect to a lamp filament having different temperature characteristics, a transparent means for mounting said second scale, means for superposing a distorted image of said standard scale upon said second scale with predetermined graduations thereof in coincidence with said calibrated points, and cooperating means for photographically reproducing the effect of said distorted superimposed standard scale.

CHARLES O. FAIRCHILD.
FRANCIS E. BASH.